United States Patent [19]

Kleine

[11] 4,051,905
[45] Oct. 4, 1977

[54] DRILL FOR PERCUSSION DRILLING MACHINES

[75] Inventor: Werner Kurt M. Kleine, Uphusen, Germany

[73] Assignee: Gerbruder Heller, Uphusen, Germany

[21] Appl. No.: 455,896

[22] Filed: Mar. 28, 1974

[51] Int. Cl.² ............................................. E21C 15/02
[52] U.S. Cl. ................................. 173/104; 64/27 NM; 173/132; 279/19.3
[58] Field of Search ......................... 279/19.2, 19.3, 19, 279/103, 19.5, 19.6, 16, 19.7, 20; 173/132, 128, 133, 139, DIG. 2, 104–111; 175/415, 325, 320, 409; 403/361, 365; 64/27 NM; 408/226

[56] References Cited

U.S. PATENT DOCUMENTS

| | | | |
|---|---|---|---|
| 1,393,072 | 10/1921 | Bayles | 279/19 |
| 2,041,704 | 5/1936 | Gordon et al. | 403/365 X |
| 2,043,442 | 6/1936 | McNeil | 279/19 X |
| 2,268,577 | 1/1942 | Drewett | 403/361 |
| 2,278,707 | 4/1942 | Luttgens | 173/132 |
| 2,606,366 | 8/1952 | Stevens | 408/226 X |
| 2,685,274 | 8/1954 | Liddicoat | 279/19.6 UX |
| 2,951,706 | 9/1960 | Dean | 279/19.5 |
| 2,997,024 | 8/1961 | McLean | 279/19.5 UX |
| 3,372,763 | 3/1968 | Fischer | 175/409 X |
| 3,751,176 | 8/1973 | Von Hollen | 408/226 X |
| 3,842,942 | 10/1974 | Jensen et al. | 175/320 X |

FOREIGN PATENT DOCUMENTS

| | | | |
|---|---|---|---|
| 1,073,410 | 1/1960 | Germany | 279/19.3 |
| 521,323 | 5/1940 | United Kingdom | 279/19.3 |
| 807,819 | 1/1959 | United Kingdom | 279/19.5 |
| 128,261 | 12/1958 | U.S.S.R. | 408/226 |

*Primary Examiner*—Ernest R. Purser
*Attorney, Agent, or Firm*—Wigman & Cohen

[57] ABSTRACT

A drill for use especially with percussion drilling machines and rotary drill hammers for working rock and concrete is disclosed. The drill includes an elongated shank having a leading and trailing end, the latter of which is adapted to receive axial blows from the drilling machine. A unitary plastic receiving part at least partly encloses and mechanically interlocks with the shank periphery adjacent the trailing end of the shank. The exterior of the plastic receiving art is threaded for engagement with interior threads of a drilling machineadapter.

13 Claims, 10 Drawing Figures

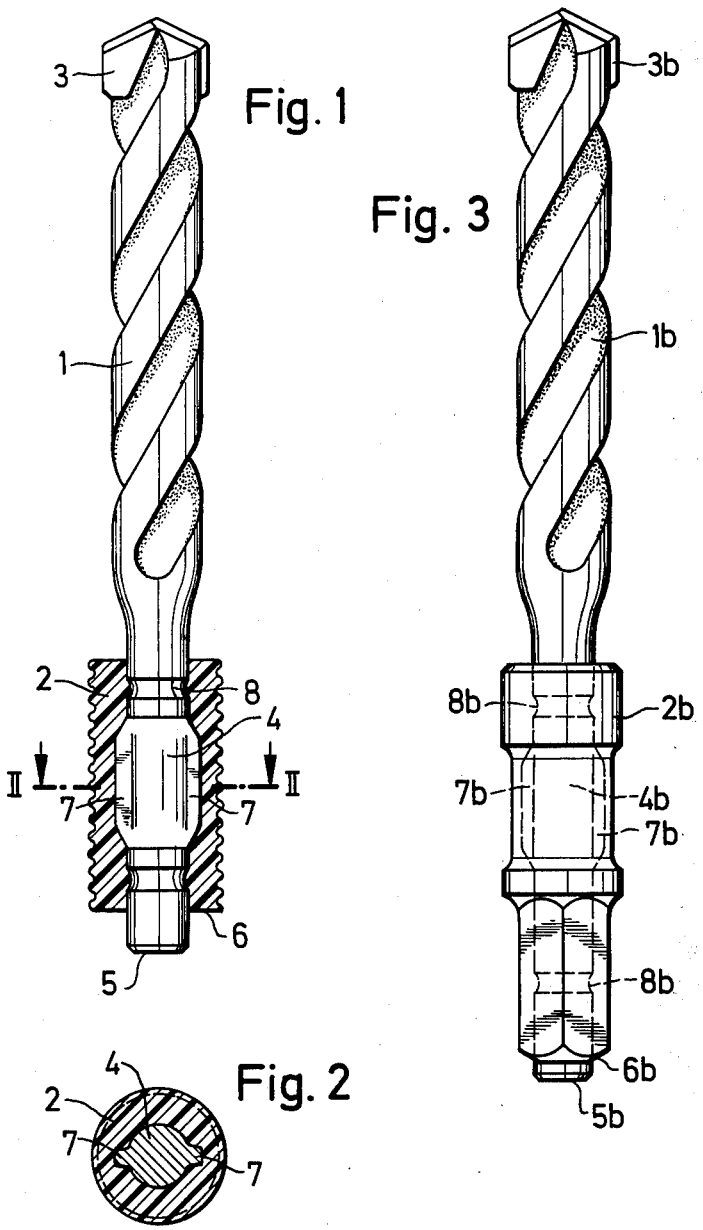

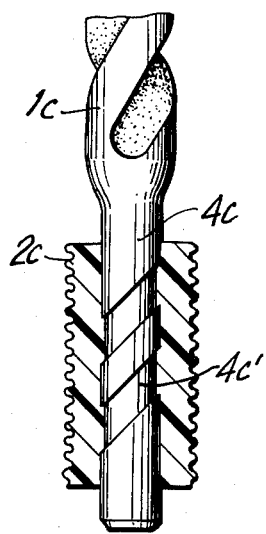
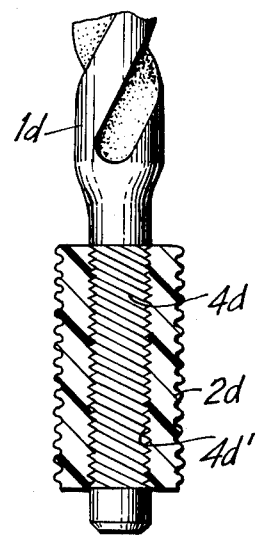
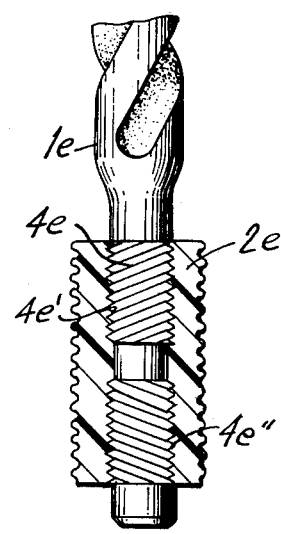
FIG. 4    FIG. 5    FIG. 6
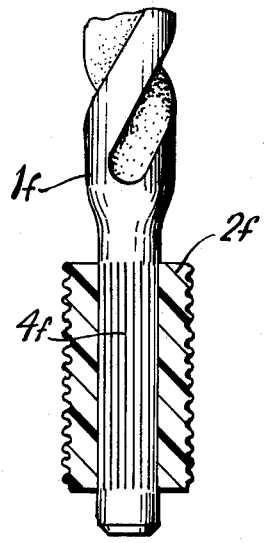
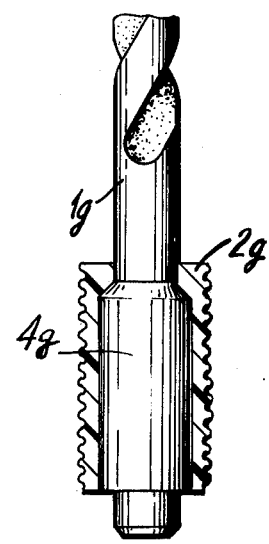
FIG. 7    FIG. 8

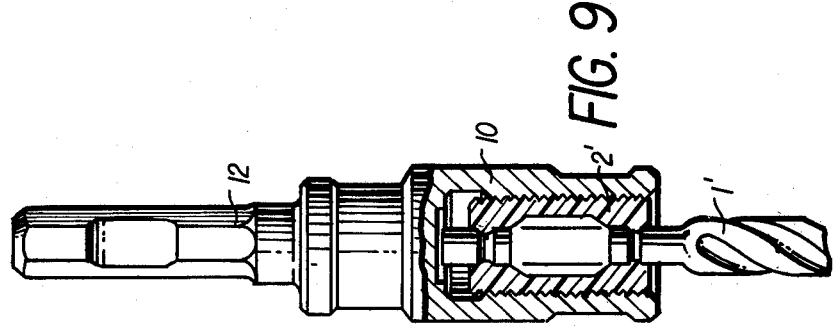
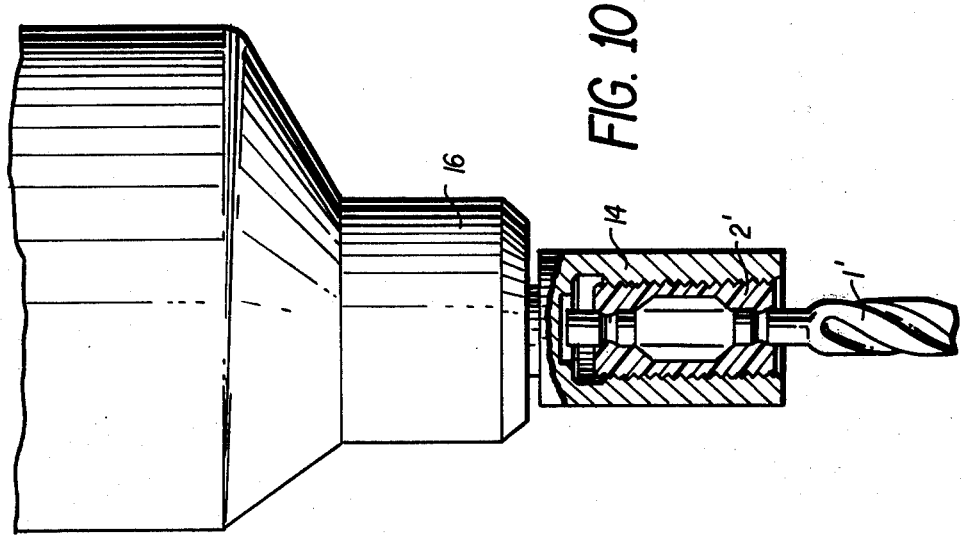

DRILL FOR PERCUSSION DRILLING MACHINES

SUMMARY OF THE INVENTION

The present invention is directed to a drill for use in a machine employed in working on rocks and concrete, especially in connection with percussion drilling machines or rotary drill hammers, and, more particularly, its concerns a receiving part secured to the end of the drill which seats into the drilling machine.

Percussion drilling machines or rotary drill hammers impart to the drill a continuous or discontinuous rotation about its longitudinal axis and deliver blows to the drill acting in the direction of drill feed. These various rotational and percussion forces represent a considerable load on the drill, particularly in rotary drill hammers. As a result, the drill is loaded by a torque of varying strength and by blows directed against its end fitted into the drilling machine. Both experience and testing of long duration have shown that the end of the drill on the machine side, hereinafter referred to as its receiving end, has, in order to improve the transmission of the forces acting on the drill, a hexagonal or polygonal cross section or a spline shaft or, as an alternative, the receiving end is provided with a single or multiple thread, preferably a round or trapezoidal thread or a combination of both types of thread. The adapter or chuck on the drilling machine is designed to correspond to the shape of the receiving end on the drill. Known machine adapters and drills are formed of tempered steel. However, the parts formed of tempered steel have certain severe disadvantages which, to date, have not been possible to eliminate though intensive efforts in that direction have been made for a long period of time.

The machine adapter should have about the same useful life as other parts of the drilling machine, that is, it must be capable of use for a greater period of time than the receiving end of the drill. Due to the torque load and the axial blows exerted against the receiving end of the drill, which in drill hammers can lead to an axial movement of several millimeters between the end of the machine adapter, both the machine adapter and the receiving end of the drill are subject to considerable wear. After several drills have been worn out, the machine adapter is no longer true to its original dimensions. Usually the play between the machine adapter and the receiving end of the drill has become so great, for example, in drill hammers, that even if a few particles of the drilled material enter the machine adapter they are sufficient to damage even the receiving end of a new drill. Further, poor tool guidance, increased heat development, and slower drilling operation result when such play develops. In addition, because of the contamination present on a construction site, the introduction of the material being drilled or other dirt particles into the machine adapter are likely to cause problems. For instance, the dirt particles in the machine adapter tend to cause jamming of the tool or to result in increased friction between the receiving part and the machine adapter. When increased friction develops, the drilling output drops and the dirt particles act as abrasive means so that the amount of wear on the receiving end of the drill and in the machine adapter is increased. Accordingly, the useful life of a drill rod, measured in the number of feet drilled, is much shorter in worn-out drilling machine adapters as compared to new adapters. Therefore, it is frequently necessary to replace the machine adapter several times during the lifetime of the drilling machine and such a replacement is quite costly.

The present invention is directed to overcoming the above problems and to protecting the machine adapter while maintaining good drilling output. The present invention solves the problems experienced in the past by enclosing the receiving end of the drill rod in a material which is less hard compared to that of the drill rod or the machine adapter and which is tightly secured on the receiving end of the drill. Further, the trailing end of the drill rod is located in the same plane as the trailing end of the receiving part or it projects through it so that the trailing end of the drill rod is not closed or covered by the receiving part.

The receiving part secured on the receiving end of the drill consists preferably of aluminum, an aluminum alloy or a plastics material which is reinforced with a filling material, for example glass fibers, whisker metals or graphite. Further, a substance can be included in the plastics material for increasing its sliding property. The receiving part is secured to the receiving end of the drill rod, for example, by shrinking or by die-casting the receiving part around the drill rod, with the receiving part being given its final shape as it is formed on the drill rod. When the receiving part is die-cast around the drill rod, it has the advantage that the receiving end of the drill rod can be provided with grooves or tangs for improving the transmission of torque between the receiving part and the shank portion of the drill rod. Tests have shown that it is particularly advantageous if helical grooves are formed on the receiving end of the drill rod with one part of the grooves having a right-hand twist and the other part a left-hand twist. Instead of helical grooves, threads can be used on the receiving end of the drill rod. Circumferential grooves or radially extending tangs formed on the receiving end of the drill rod can be used advantageously for establishing a fixed or rigid connection between the receiving part and the drill rod. Depending on the torque to be transmitted or on the striking force provided by the drilling machine, it is advisable to use at least one of the above interconnecting elements or to employ a combination of them. Where less powerful drilling machines are used, it is frequently sufficient to leave the end of the drill rod round or to provide it with surfaces extending parallel to the axis of the rod.

Since the material used in forming the receiving part is not as hard as the material used in forming the drill rod or the drilling machine adapter, the wear developed in the machine adapter, caused by the action of the receiving end of the drill rod, is drastically reduced because no hard edges or surfaces act on the adapter in the transmission of the torque from the adapter to the drill rod. Any dirt particles which enter the adapter during drilling quickly penetrate into the soft surface of the receiving part and, as a result, do not have any wearing effect on the machine adapter. Because of the soft characteristic of the material forming the receiving part on the drill rod, as compared to the material used in forming the machine adapter and the drill rod, the receiving part is deformed, under the influence of the torque transmitted to it, until all of its surfaces or threads carry a uniform amount of the torque. As a result, the surface pressure acting between the receiving part and the machine adapter is considerably reduced. Because of this reduction the wear of the adapter and the receiving part are also reduced and continued good guidance of the drill rod in the machine adapter is obtained. The present invention is particularly advantageous because it provides uniform support for all the threads on the receiving part of the drill rod when it is screwed into the machine adapter, this arrangement prevents wedging of the drill rod in the machine adapter during drilling operations under the influence of the torque development and the drill rod can be unscrewed by hand after the drilling operation has been completed. In the past such removal has been possible only if the receiving end of the drill rod and the adapter were cleaned and well oiled before the rod was threaded into the adapter.

It is absolutely necessary that the shank of the drill rod passes through the receiving part in the axial direction of the rod so that its rearward end at least extends to or projects beyond the rearward end of the receiving part within the machine adapter. With such an arrangement the feeding forces or the striking force are transmitted completely or substantially completely to the drill rod with the striking force being transmitted directly to the cutting edge of the drill rod, undamped by the softer receiving part, and deformation to the receiving part by the striking force is avoided.

It has been a complete surprise to the man skilled in the art that a drill rod could be used, for example, in rotary drill hammers, which have problems with regard to strength, even when high-grade tempered steel is used, and is completely operable for a long period of time, where the receiving part is formed of a less hard material, for example, of aluminum or a plastics material. In testing it was found that, after the hard metal edge had worn off, a plastics material receiving part showed less wear on a drill rod of the present invention than a drill rod having a receiving end formed of tempered steel as is conventional.

It was also to be expected, because of the temperatures experienced at the receiving end of conventional drills used in drill hammers, that in a drill rod embodying the present invention with a plastics material receiving part, the material would soften and thus be incapable of transmitting torque. Contrary to expectations, it has been found that less energy is lost with the present invention between the machine adapter and the receiving part, with the result that more energy acts on the cutting edge of the drill rod and the drilling progresses much faster with the receiving end being heated to a lesser degree than on conventional drill rods.

The wall thickness of the receiving part surrounding the receiving end of the drill rod is of minor importance. Even when the wall thickness of the receiving part is less than 1mm it is possible for the drilling operations to be carried out very effectively.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a side elevational view of a drill rod embodying the present invention with the receiving part shown in section and designed as a threaded member;

FIG. 2 is cross sectional view of the drill rod shown in FIG. 1 taken along the line II—II in FIG. 1;

FIG. 3 is a side elevational view of another drill rod embodying the present invention with a hexagonally-shaped receiving part.

FIGS. 4, 5, 6, 7 and 8 are side elevational views partly in sections of further embodiments of the present invention; and FIGS. 4, 5, 6, 7 and 8 are side elevational views, partly in section, of further embodiments of the present invention.

FIGS. 9 and 10 are side elevation views, partly in section, showing the engagement of the receiving part of the drill with a drilling machine adapter.

DETAILED DESCRIPTION OF THE INVENTION

In FIGS. 1 and 2 a drill rod includes a drill shank 1 having a cutting element 3 located at its first or cutting end, that is, its end which is placed against the material to be drilled. At the second end of the drill shank, that is, the receiving end 4 which is inserted into the adapter of a drilling machine, a receiving part 2 is die-cast about the drill shank. The receiving part 2 is formed of a material which is less hard than the material forming the drill shank 1. The trailing end 5 of the drill shank 1 projects from the trailing end 6 of the receiving part 2, so that axial blows delivered to the drill rod in the drilling direction are transmitted directly to the trailing end 5 of the shank and then to the cutting element 3. For the transmission of torque from the adapter on a drilling machine, not shown, to the drill shank 1, axially arranged tangs 7 extend radially outwardly from the drill shank for engagement within the material forming the receiving part 2. In addition, circumferentially extending annular slots 8 are formed in the receiving end 4 of the drill shank so that the material of the receiving part 2 seats within the annular slots and serves to lock the receiving part against movement in the axial direction. The tangs 7 serve to prevent relative movement between the receiving part 2 and the receiving end 4 about the axis of the drill rod.

In FIG. 3, the shank 1b of the drill rod has a cutting element 3b at its first end and its receiving end 4b is surrounded by a receiving part 2b having a hexagonal shape. In this arrangement, the trailing end 5b of the drill shank 1a projects axially from the corresponding trailing end 6b of the receiving part. Therefore, as in the embodiment shown in FIGS. 1 and 2, axial blows are transmitted from the trailing end 5b directly to the cutting element 3b. Axially disposed radially extending tangs 7b are formed on the receiving end 4b of the drill shank 1b for locking engagement within the material of the receiving part 2b and circumferentially extending annular slots 8b provide locking engagement against axial movement between the receiving part and the receiving end of the drill shank. The illustrated and described arrangements for affording connection between the receiving part and the receiving end of the drill shank are shown only by way of example, other arrangements are possible, as indicated above, to achieve the same locking effect. Similarly, while the receiving part has been shown in FIG. 1 as being threaded and in FIG. 3 as being hexagonally-shaped, other shapes can be used with like effectiveness.

In FIGS. 4 to 8 other arrangements are illustrated for affording connection between the receiving part 2 and the receiving end 4 of the drill shank 1. FIG. 4 shows grooves 4c′ in the receiving end 4c of drill shank 1c with the receiving part 2c filled into the grooves. FIG. 5 exhibits threads 4d′ forming the grooves in the receiving end 4d of drill shank 1d with the material of the receiving part 2d filled into the grooves formed by the threads. FIG. 6 illustrates two axially extending sets of grooves 4e', 4e" in the receiving end 4e of the drill shank 1e, one set of grooves has a right hand twist and the other set of grooves has a left hand twist. FIG. 7 represents a knurled surface 4f on the receiving end of drill shank 1f with the depressions formed by the knurled surface filled with the material of the receiving part 2f. FIG. 8 delineates the receiving end 4g with a larger diameter than the drill shank 1g between its ends.

FIGS. 9 and 10 illustrate an embodiment of the receiving part in combination with a drilling machine adapter. In FIG. 9, the drill 1' and its threaded receiving part 2' are threadably inserted into an adapter 10 having a shank 12 which is received in a drilling machine in a known manner. FIG. 10 shows the drill 1' and its threaded receiving part 2' threadably inserted into a drilling machine adapter 14 integrally formed with a drilling machine 16.

While specific embodiments of the invention have been shown and described in detail to illustrate the application of the inventive principles, it will be understood that the invention may be embodied otherwise without departing from such principles.

What is claimed is:

1. A drill for use in a drilling machine for working on rocks and concrete and especially for use with percussion drilling machines and rotary drill hammers, comprising an axially elongated drill shank formed of a hardened material and having a first end arranged to contact within the adapter of the drilling machine, said adapter being provided with an inner thread, said second end having an axially extending outer surface, wherein the improvement comprises that a unitary receiving part is disposed in mechanical interlocking surface contact connection with and extends at least partly about and laterally encloses the axially extending outer surface of the second end of said drill shank and is formed entirely of a plastic material which has a lower hardness than that of the material forming said shank, said receiving part having an axially extending radial inner surface in full surface contact with the axially extending outer surface of said second end of said drilling shank, said surfaces being formed for mechanical interlocking connection, said receiving part having further and axially extending radial outer surface provided with a thread for engagement with said inner thread of the adapter of the drilling machine so that because of its lower hardness said receiving part is deformable under the action of the torque transmitted to it by the adapter, said receiving part having a leading end closer to the first end of said shank and a trailing end spaced axially from the leading end, and the second end of said drill shank extending through said receiving part at least to the trailing end of said receiving part so that axial blows are transmitted directly to the second end of said drill shank.

2. A drill, as set forth in claim 1, characterized in that said receiving part has reinforcing filler means in said plastics material.

3. A drill, as set forth in claim 2, wherein said filler means are selected from one of the group consisting of glass fibers, metal whiskers and graphite.

4. A drill, as set forth in claim 2, wherein said plastics material forming said receiving part includes a substance for increasing its sliding property.

5. A drill, as set forth in claim 1, wherein grooves are formed in the surface of the second end of said drill shank.

6. A drill, as set forth in claim 5, wherein the grooves in the second end of said drill shank are located in the axial range of said receiving part and comprise at least one helical groove and said material forming said receiving part is filled into said helical groove.

7. A drill, as set forth in claim 5, characterized in that said grooves on the second part of said drill shank are located in the axial range of said receiving end and that said grooves are in the form of threads with the material of said receiving part extending into and gripping said threads.

8. A drill, as set forth in claim 5, characterized in that said grooves on said second end of said drill shank extend obliquely to the axis of said drill shank and one section of said groove has a left-hand twist and the other section of said groove has a right-hand twist.

9. A drill, as set forth in claim 1, characterized in that the second end of said drill shank in the axial range of said receiving part has at least one annular slot concentric with the axis of said drill shank with the material of said receiving part filled into said annular slot.

10. A drill, as set forth in claim 1, characterized in that the second end of said drill shank in the axial range of said receiving part has at least one axially arranged tang extending radially outwardly from said drill shank and extending into the material of said receiving part.

11. A drill, as set forth in claim 17, characterized in that the surfaces on the second end of said drill shank in the axial range of said receiving part are filled by the material of said receiving part.

12. A drill, as set forth in claim 17, characterized in that the second end of said drill shank in the axial range of said receiving part has a knurled surface with the depressions formed by said knurled surface filled with the material of said receiving part.

13. A drill, as set forth in claim 17, characterized in that the end surface on the second end of said drill shank has a larger diameter than said drill shank intermediate its first and second ends.

* * * * *

UNITED STATES PATENT AND TRADEMARK OFFICE
CERTIFICATE OF CORRECTION

PATENT NO. : 4,051,905
DATED : Oct. 4, 1977
INVENTOR(S) : Werner Kurt M. Kleine

It is certified that error appears in the above-identified patent and that said Letters Patent are hereby corrected as shown below:

In the ABSTRACT, line 9, change "art" to --part--.

Column 4, line 3, change "." to --; and--.

Claim 1, column 5, line 32, after "contact" insert --the material to be drilled and a second end arranged to seat--.

Claim 7, column 6, line 22, change "part" to --end--.

Claim 7, column 6, line 23, change "end" to --part--.

Claim 11, column 6, line 42, change "17" to --1--.

Claim 12, column 6, line 46, change "17" to --1--.

Claim 13, column 6, line 51, change "17" to --1--.

Signed and Sealed this

Thirteenth Day of June 1978

[SEAL]

Attest:

RUTH C. MASON
Attesting Officer

DONALD W. BANNER
Commissioner of Patents and Trademarks